United States Patent
Chen et al.

(10) Patent No.: US 12,275,907 B2
(45) Date of Patent: Apr. 15, 2025

(54) MICRO-REACTION DEVICE AND METHOD FOR PREPARING BIODIESEL BY BASE CATALYSIS

(71) Applicant: Shandong Tsingchuang Chemicals Co. Ltd., Dezhou (CN)

(72) Inventors: Guiguang Chen, Dezhou (CN); Chengjin Wang, Dezhou (CN); Mian Duanmu, Dezhou (CN); Yong Sun, Dezhou (CN)

(73) Assignee: Shandong Tsingchuang Chemicals Co. Ltd., Dezhou (CN)

( * ) Notice: Subject to any disclaimer, the term of this patent is extended or adjusted under 35 U.S.C. 154(b) by 0 days.

(21) Appl. No.: 18/535,047

(22) Filed: Dec. 11, 2023

(65) Prior Publication Data

US 2024/0101916 A1    Mar. 28, 2024

Related U.S. Application Data

(63) Continuation of application No. PCT/CN2021/102152, filed on Jun. 24, 2021.

(51) Int. Cl.
*C10L 1/02* (2006.01)
*B01J 14/00* (2006.01)
(Continued)

(52) U.S. Cl.
CPC .............. *C10L 1/026* (2013.01); *B01J 14/00* (2013.01); *B01J 19/0066* (2013.01);
(Continued)

(58) Field of Classification Search
CPC .... B01J 14/00; B01J 19/0066; B01J 19/0093; B01J 19/242; B01J 2219/00033;
(Continued)

(56) References Cited

U.S. PATENT DOCUMENTS

| | | | | |
|---|---|---|---|---|
| 5,514,820 A | * | 5/1996 | Assmann | ............... C07C 67/03 |
| | | | | 554/167 |
| 2009/0165366 A1 | * | 7/2009 | Jovanovic | ............ B01J 19/0093 |
| | | | | 44/388 |

FOREIGN PATENT DOCUMENTS

| CN | 1736577 A | * | 2/2006 |
|---|---|---|---|
| CN | 101514293 A | | 8/2009 |

(Continued)

OTHER PUBLICATIONS

English-language machine translation of CN 1736577 A (Year: 2006).*

(Continued)

*Primary Examiner* — James C Goloboy
(74) *Attorney, Agent, or Firm* — Westbridge IP LLC (57) ABSTRACT

A micro-reaction device for preparing biodiesel by base catalysis includes a feeding system, a micro-reaction apparatus, and a separation apparatus. The feeding system is in communication with the micro-reaction apparatus, and the micro-reaction apparatus is in communication with the separation apparatus; the micro-reaction apparatus includes a micro-reactor, and the micro-reactor is a micro-dispersion micro-reactor; in the micro-reaction apparatus, an oil phase and short chain alcohols undergo an ester exchange reaction under base catalysis to generate fatty acid esters and by-product glycerol; and the micro-dispersion reactor is provided with a micro-dispersion structure for dispersing the short chain alcohols into micro-droplets. By the solution of the present application, the intrinsic safety of a process is improved, the reaction time is greatly shortened, the resistance to material flow is lower, the system operating pressure is low, and the single-channel treatment capacity is large, which is 10-500 times that of a micro-channel reactor.

15 Claims, 3 Drawing Sheets

(51) Int. Cl.
  *B01J 19/00* (2006.01)
  *B01J 19/24* (2006.01)
  *C10G 3/00* (2006.01)
  *C11C 3/10* (2006.01)

(52) U.S. Cl.
  CPC ......... *B01J 19/0093* (2013.01); *B01J 19/242* (2013.01); *C10G 3/42* (2013.01); *C11C 3/10* (2013.01); *B01J 2219/00033* (2013.01); *B01J 2219/00889* (2013.01); *B01J 2219/00905* (2013.01); *B01J 2219/00961* (2013.01); *C10G 2400/04* (2013.01); *C10L 2200/0476* (2013.01); *C10L 2200/0484* (2013.01); *Y02E 50/10* (2013.01)

(58) Field of Classification Search
  CPC .... B01J 2219/00889; B01J 2219/00905; B01J 2219/00961; C10G 3/42; C10G 2400/04; C10L 1/026; C10L 2200/0476; C10L 2200/0484; C11C 3/10; Y02E 50/10
  See application file for complete search history.

(56) References Cited

FOREIGN PATENT DOCUMENTS

| CN | 103103025 B | | 8/2014 |
|---|---|---|---|
| CN | 104478711 A | | 4/2015 |
| CN | 106800976 A | | 6/2017 |
| CN | 109621858 A | | 4/2019 |
| CN | 111411021 A | * | 7/2020 |
| CN | 111411024 A | | 7/2020 |
| CN | 211725714 U | | 10/2020 |
| CN | 112481041 A | | 3/2021 |

OTHER PUBLICATIONS

Merck Index, Monograph ID M10127, retrieved from the internet at <https://merckindex.rsc.org/monographs/m10127> on Nov. 5, 2024 (Year: 2020).*

Akkarawatkhoosith et al., Evaluation on safety and energy requirement of biodiesel production: Conventional system and microreactors, Process Safety and Environmental Protection, 2019, 132, pp. 294-302, dated Oct. 16, 2019.

Billo et al., A cellular manufacturing process for a full-scale biodiesel microreactor, Journal of Manufacturing Systems, 2015, 37, pp. 409-416, dated Aug. 7, 2014.

International Search Report and Written Opinion issued in corresponding PCT Application No. PCT/CN2021/102152, dated Dec. 23, 2021.

Mohadesi et al., Production of biodiesel from waste cooking oil using a homogeneous catalyst: Study of semi-industrial pilot of microreactor, Renewable Energy, 2019, 136, pp. 677-682, dated Jan. 16, 2019.

Natarajan et al., An overview on the process intensification of microchannel reactors for biodiesel production, Chemical Engineering & Processing: Process Intensification, 2018, 136, pp. 163-176, dated Dec. 21, 2018.

Qu, Study on the Process of Biodiesel Production in Microcapillary Reactor, Master's Thesis submitted to Zhejiang University, dated May 5, 2015.

* cited by examiner

MICRO-REACTION DEVICE AND METHOD FOR PREPARING BIODIESEL BY BASE CATALYSIS

CROSS-REFERENCE TO RELATED APPLICATIONS

The present application is a continuation of International Application No. PCT/CN2021/102152, filed on Jun. 24, 2021, the content of which is incorporated herein by reference in its entirety.

TECHNICAL FIELD

The present application belongs to the field of biodiesel synthesis technologies, and relates to a micro-reaction device and a micro-reaction method for preparing biodiesel by base catalysis.

BACKGROUND

Biodiesel is a green new energy source and an important alternative to conventional petrochemical-based diesel. In 2019, the world's total production of biodiesel was 34.7 million tons, and Europe was the main producer and consumer country. China's biodiesel mainly uses waste greases as raw materials, with a production of about 510000 tons, mainly exported to Europe. The production technology of biodiesel is mainly based on ester exchange, and base catalysis in a stirred tank is the most commonly used technology. The current production technology of biodiesel mainly relies on a batch method of tank stirring. However, due to the incompatibility between a raw material fatty acid glyceride and an alcohol phase, a reaction product fatty acid methyl ester or fatty acid ethyl ester is incompatible with a by-product glycerol. Therefore, the reaction system involves mixing and reaction of two liquid phases, especially mass transfer control in an early stage of reaction. The stirring rate in the stirred tank is limited, so the conventional stirring reaction usually takes more than 2 hours. In recent years, researchers have developed a continuous method based on a plurality of stirred tanks connected in series on the basis of stirred reactors. CN106800976A discloses a method for continuously preparing biodiesel by glycerol circulation, where heated crude oil and glycerol are simultaneously introduced into a reactor; a temperature, a vacuum degree, and a flow rate of raw materials are controlled for direct esterification reaction; and after the reaction, methanol dissolved with potassium hydroxide is simultaneously introduced into a continuous ester exchange reactor for cyclic reaction. CN112481041A discloses a continuous ester exchange reaction apparatus including two stirred tanks and a tubular reactor connected in series. However, these methods have the disadvantages of long reaction time, large space occupation, and the like.

In recent years, micro-channel micro-reactors have been able to shorten the reaction time from 30-60 min to 1-2 min, with obvious advantages. Therefore, the emerging micro-reaction technology in the research of biodiesel preparation has become one of the important hot spots. On the other hand, the treatment capacity of micro-channel micro-reactors is small, the flow rate of an oil phase is usually 0.5-1.0 mL/min (Y. Natarajan et al. Ch Eng & Pro: Process Intent. 2019, 136:163-176), and the research is mainly in the laboratory stage. CN109621858A discloses a method for synthesizing and separating biodiesel using a catalyst wall supported micro-reactor and a differential separator with different interface properties, showing in the embodiments of the patent that the treatment capacity of an oil phase in a single channel is 0.5-1 mL/min. CN103103025B discloses a "Z" channel micro-reactor with a single-channel oil phase treatment capacity of 10-20 mL/min and a residence time of 0.1-1 min, showing in the embodiments of the patent that the treatment capacity is already better than that of most of the micro-channel reactors in the literature, but is still very small. If a micro-channel micro-reactor is numerically amplified to achieve a pilot scale of 1000 tons/year, one thousand to tens of thousands of micro-channels are required for parallel production: for example, 14000 channels are required in R. Billo et al. Journal of Manufacturing Systems 37(2015)409-416; 14000 channels are required in Qu Gang's master's thesis from Zhejiang University in 2015; 2500 channels are required in M. Mohadesi et al. Renewable Energy 136 (2019) 677; and 960 channels are required in N. Akkarawatkhoosith et al. Process Safety & Environmental Protection. 132(2019) 294-302. Therefore, the practical application technology is very difficult. On the other hand, most of raw oils for biodiesel, such as gutter oil, are not very clean systems. For micro-channel reactors, small channel size (diameter within 0.1-1 mm) and device blockage problems are difficult to avoid. In the actual production of biodiesel, the scale of biodiesel production is often 10000 to 200000 tons per year, so existing micro-channel reactor technologies still have great technical difficulties in the actual industrial preparation of biodiesel.

In the existing technologies, the stirred tank reactors have long reaction time and large space occupation; and the existing micro-channel reactors have a small single-channel treatment capacity and are difficult to industrialize. The micro-reaction device and method of the present application involve a method for preparing biodiesel by continuous base catalysis with high treatment capacity, can solve the problems of the existing technologies, and achieve efficient and continuous preparation of biodiesel.

SUMMARY

The objective of the present application is to provide a novel micro-reaction technology for synthesizing biodiesel by base catalysis, which can solve at least one of the above problems. Specifically, a technical solution for achieving the above invention objective is as follows.

A device for preparing biodiesel by base catalysis includes a feeding system, a micro-reaction apparatus, and a separation apparatus, where the feeding system is in communication with the micro-reaction apparatus, and the micro-reaction apparatus is in communication with the separation apparatus; the micro-reaction apparatus includes a micro-reactor, and the micro-reactor is a micro-dispersion micro-reactor; in the micro-reaction apparatus, an oil phase and short chain alcohols undergo ester exchange reaction under base catalysis to generate fatty acid esters and by-product glycerol; and the micro-dispersion reactor is provided with a micro-dispersion structure for dispersing the short chain alcohols into micro-droplets.

In one solution, the micro-reaction apparatus further includes a stirred tank or a tubular reactor, where the micro-reactor is connected to the stirred tank or tubular reactor and then connected to the separation apparatus; and the separation apparatus includes a stirred tank with a reduced pressure condenser and a centrifuge.

In one solution, the micro-dispersion structure is a dispersion medium membrane; the dispersion medium membrane includes but is not limited to a microporous membrane, micro sieve pores, or a micro narrow slit membrane; and a pore size of the microporous membrane, a pore size of the micro sieve pores, and a feature size of the micro narrow slit membrane are all micrometer-scale.

In one solution, the micro-reactor includes a base, a cover, and a micro-dispersion structure arranged between the base and the cover, the base being provided with a continuous phase channel, a mixing chamber, and a mixture output channel, where one end of the continuous phase channel is connected to a continuous phase inlet and the other end is connected to the mixing chamber, one end of the mixture output channel is connected to the mixing chamber and the other end is connected to a mixed material outlet; the cover is provided with a dispersion phase channel and a dispersion chamber, one end of the dispersion phase channel is connected to a dispersion phase inlet and the other end is connected to the dispersion chamber; the micro-dispersion structure is located between the dispersion chamber and the mixing chamber, where a dispersion phase enters the dispersion chamber through the dispersion phase channel and passes through a micro-dispersion medium membrane under pressure to form dispersed micro-droplets, the micro-droplets enter the mixing chamber and mix with a continuous phase entering from the continuous phase channel to form a mixture, and the mixture enters a next process from the mixture output channel.

In one solution, a core structure of the micro-dispersion reactor is the micro-dispersion medium membrane.

In one solution, the micro-dispersion medium membrane is a microporous membrane, a micro-filtration membrane, or a micro narrow slit membrane, where a pore size of the microporous membrane, a pore size of the micro sieve pores, and a feature size of the micro narrow slit membrane are all micrometer-scale. The dispersion phase is dispersed into micro-droplets by the dispersion medium under the drive of a pressure difference, and the micro-droplets mix with the continuous phase, thereby increasing the mass transfer surface area and improving the mass transfer efficiency.

In one solution, the pore size of the microporous membrane is 0.1-80 microns; preferably, the pore size is 0.1-1 micrometer, with a porosity of 5-35%; preferably, the pore size is 1-10 microns, with a porosity of 10-30%; and more preferably, the pore size is 1-10 microns, with a porosity of 20-30%. The pore size of the micro sieve pores is 40-300 microns, and preferably 100-200 microns; the number of micro sieve pores in a single channel is 1-50, and preferably 1-10; and the micro sieve holes include but are not limited to circular holes, square holes, and rectangular holes. Further, a gap between the micro narrow slits is 0.1-3 millimeters, and preferably 1-2 millimeters. A total area of the micro sieve pores/a total area of the micro narrow slits accounts for 3%-5% of the area of the membrane. The micro sieve pores/micro narrow slits are straight through pores, not curved structures like micropores, so the pore area can be smaller than the microporous area, which ensures both transmittance and the formation of micro-droplets from the dispersion phase.

The flow rate of the dispersion phase depends on the process. When the porosity of the dispersion medium is too small, the flow rate decreases sharply or the pressure increases sharply when the dispersion phase passes through the membrane, which easily causes membrane damage and failure; and when the porosity is too large, the formation of droplets will be affected, and even the flow pattern of two phases is changed to affect the mass transfer area of the two phases.

In one solution, the dispersion phase is dispersed into micro-droplets having a scale of 1-500 microns, and preferably 10-100 microns. If the droplets formed by the dispersion phase are too small, it is difficult to separate two phases, and the difficulty of separation in subsequent processes is increased. If the droplets formed by the dispersion phase are large, the specific surface area of mass transfer between the two phases decreases sharply, which is not conducive to the mass transfer between the two phases and the rapid progress of the reaction.

In one solution, the dispersion phase channel delivers the dispersion phase, the continuous phase channel delivers the continuous phase, the mixture output channel delivers a reaction mixture, and the mixing chamber connects the dispersion phase channel, the continuous phase channel, and the mixture output channel together and provides a mixing place for the dispersion phase and the continuous phase, where the feature size of each channel is millimeter-scale. Compared with micrometer-scale channels of a micro-channel reactor, the hybrid channels significantly reduce material flow resistance and greatly increase single-channel treatment capacity.

In one solution, heat exchangers are arranged on the continuous phase channel and the dispersion phase channel of the micro-reactor respectively to cool or heat the continuous phase and the dispersion phase to temperatures required by the process before entering the micro-reactor.

In one solution, the separation apparatus mainly functions to separate three types of substances in the system after the reaction: excess short chain alcohols, reaction product fatty acid esters (short chain alcohol esters), and by-product glycerol. The short chain alcohols are mainly separated by evaporation and condensation, and a device therefor includes a stirred tank with a reduced pressure condenser, a flash tank, a falling film reactor, or the like. The product and the by-product are two liquid phases and are mainly separated by liquid-liquid separation, and a device therefor includes a static separator in a stirred tank, a continuous separator in a tubular reactor, a centrifugal separator, or the like.

In one solution, the continuous phase channel includes a reflux apparatus. The reflux apparatus returns some of the separated reaction products, and the returned reaction products mix and exchange heat with the original raw oil phase and then enter the continuous phase channel of the micro-reactor. The reflux process mainly aims to reduce the content of glycerides in the raw material and increase the content of fatty acid esters (short chain alcohol esters) in the raw material.

In one solution, the micro-reactor apparatus and the separation apparatus are a set of reaction device system; the reaction device system can operate as a single set or multiple sets in series; The series operation of multiple sets refers to use of the reaction product of the previous set of reaction device as a continuous phase raw material for the next set of reaction device to continue the reaction, so as to achieve a higher reaction yield.

In one solution, the micro-reactor device further includes a reflux pump for reflux of some crude biodiesel separated by the separation apparatus, and the crude biodiesel is mixed with the initial raw oil as a continuous oil phase of the micro-reactor apparatus for reaction. The reflux crude biodiesel accounts for 0-40%, preferably 10-20%, of a sum of the raw oil and the crude biodiesel.

The present application further invents a method for preparing biodiesel by base catalysis using the micro-reaction device according to any one of the above solutions. The method includes:
(1) dissolving a base catalyst in short chain alcohols to form short chain alcohol-base catalyst solution as an alcohol phase;
(2) delivering the alcohol phase and an oil phase to dispersion phase and continuous phase feed ports of the micro-reactor by the feeding system respectively, followed by a mixing reaction in the micro-reactor to obtain a reaction solution; and
(3) delivering the reaction solution to the separation apparatus after complete reaction in the tubular reactor or stirred tank.

In one solution, reaction materials are mixed and react in the micro-reactor in two forms: a continuous phase and a dispersion phase, where the oil phase serves as the continuous phase, the alcohol phase serves as the dispersion phase, and the dispersion phase enters the continuous phase by means of a dispersion medium in a form of micro-droplets.

In one solution, the oil phase contains 2-100% of fatty acid glycerides, with an acid value of ≤6, and preferably ≤3.

In one solution, the dispersion phase is controlled at a temperature of 20-75° C., preferably 50-60° C., and more preferably 54-60° C. by the heat exchanger before feeding; and the continuous phase is controlled at a temperature of 20-90° C., preferably 40-90° C., and more preferably 70-80° C. by the heat exchanger before feeding.

In one solution, a molar ratio of the short chain alcohols in the alcohol phase to the fatty acid glycerides in the oil phase is (3-25): 1, and preferably (3-12): 1.

In one solution, the content of the base catalyst in the alcohol phase is 1-10%, and preferably 2-6%.

Further, the short chain alcohols include but are not limited to methanol, ethanol, etc.

Further, the base catalyst includes potassium hydroxide, sodium hydroxide, potassium methoxide, sodium methoxide, potassium ethoxide, sodium ethoxide, etc.

Further, the base catalyst is 0.1-3% by mass of the oil phase, preferably 0.3-1%, and more preferably 0.3-0.5%.

Compared to the existing technologies, the micro-reaction device and method for preparing biodiesel by base catalysis provided in the present application have the following advantages.

Firstly, the intrinsic safety of a process is improved: taking short chain alcohols as an example, a reaction temperature of ester exchange between a raw material fatty acid glyceride and methanol is usually close to or slightly higher than a boiling point of the methanol, where the methanol is a toxic and harmful substance with significant toxic side effects on human eyes; the conventional stirred tank reactor is replaced with the micro-reactor having a small liquid holding capacity and short material residence time, which greatly reduces the harm of methanol volatility, thereby improving the intrinsic safety of the process.

Secondly, the reaction time is greatly shortened and the reaction efficiency is improved: the powerful mixing performance of the micro-reactor greatly improves the mixing performance of two phases in the reaction process, reduces the mass transfer resistance of the two phases, achieves an efficient reaction, and greatly shortens the reaction time from 1-2 hours in the conventional stirred reactor to less than 1 minute.

Thirdly, compared to a micro-channel reactor, the micro-dispersion micro-reactor used in the method has the following advantages: a) less resistance to material flow and lower system operating pressure; b) high tolerance to the cleanliness of raw materials and less occurrence of micro-channel blockage during operation, especially for materials with complex compositions, such as gutter oil or treated gutter oil raw materials; and c) large single-channel treatment capacity, which is 10-500 times that of the micro-channel reactor, with industrial potential.

DETAILED DESCRIPTION OF THE EMBODIMENTS

To make those skilled in the art better understand the present application, the present application will be further described in detail below with reference to the accompanying drawings and implementation methods.

A micro-reaction device for preparing biodiesel by base catalysis in the present application includes a feeding system 1, a micro-reaction apparatus 2, and a separation apparatus 3. The feeding system 1 is in communication with the micro-reaction apparatus 2, and the micro-reaction apparatus 2 is in communication with the separation apparatus 3.

The feeding system includes a raw oil tank 11 for storing a raw oil phase, an alcohol phase storage tank 12 for preparing a short-chain alcohol solution containing a base catalyst, a delivery pump 4 for delivering an alcohol phase, an alcohol phase heat exchanger 9 for heating the alcohol phase to a temperature required by a process, a delivery pump 5 for delivering the raw oil phase, and an oil phase heat exchanger for heating or cooling the raw oil phase to a temperature required by the process. In addition to the delivery pumps, a delivery system further includes a pulse damper, a back pressure valve, and a flow meter to ensure stable flow during material delivery.

The micro-reaction apparatus 2 includes a micro-reactor 6 and a tubular reactor 7, where the tubular reactor 7 is used for increasing reaction time, and a special structure or filler is further included in the tubular reactor to maintain the mixing performance of a material system.

Figure 1:
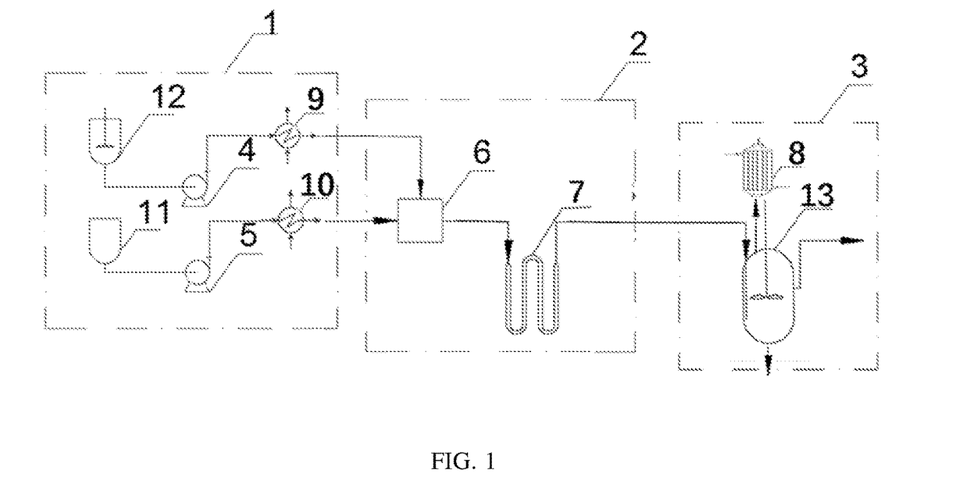
FIG. 1 is a first schematic diagram of a process for preparing biodiesel by base catalysis according to the present application.

In one solution, as shown in FIG. 1, the micro-reaction apparatus includes a micro-reactor 6 and a tubular reactor 7, where a discharge port of the micro-reactor is in communication with a feed port of the tubular reactor, and a discharge port of the tubular reactor is in communication with the separation apparatus 3.

Figure 2:
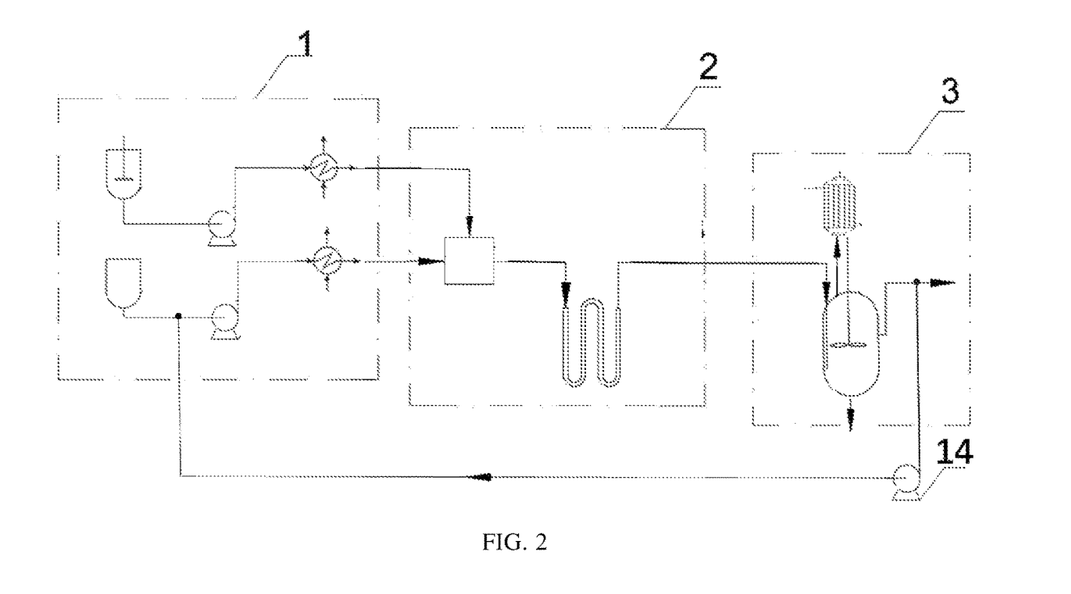
FIG. 2 is a second schematic diagram of a process for preparing biodiesel by base catalysis according to the present application.
Figure 3:
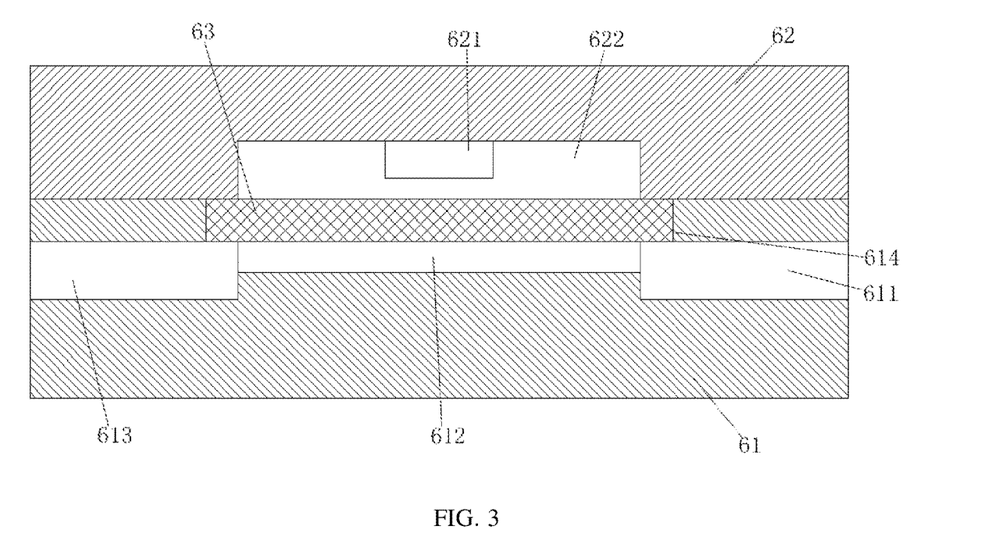
FIG. 3 is a cross-sectional view of a micro-reactor.

In one solution, as shown in FIG. 2, the micro-reaction apparatus includes a micro-reactor 6 and a tubular reactor 7, and is in communication with the separation apparatus 3. After separated by the separation apparatus, some reaction products (crude biodiesel and fatty acid-short chain alcohol esters) pass through a reflux apparatus 14 (such as a reflux pump) for reflux and are mixed with the initial raw oil phase as a continuous phase of the micro-reactor for reaction. By reflux of some reaction products, the content of the product fatty acid-short chain alcohol esters in the raw oil phase is increased, and the content of fatty acid glycerides is decreased. Taking ester exchange between methanol and fatty acid glycerides as an example, the methanol and the fatty acid glycerides are insoluble, and the solubility of the methanol in the fatty acid glycerides is very low. On the other hand, the solubility of the methanol in fatty acid methyl ester is much greater than that in the fatty acid glycerides. The reflux fatty acid methyl ester increases the solubility of the methanol, and the increase in the solubility of the methanol in the oil phase is conducive to a further increase in the rate of ester exchange.

In one solution, the micro-reactor is a micro-dispersion micro-reactor, including a micro-dispersion medium membrane, a dispersion phase channel, a continuous phase channel, a mixture output channel, and a mixing chamber. Preferably, the micro-dispersion medium membrane includes but is not limited to a microporous membrane, micro sieve pores, a micro narrow slit membrane, or the like; preferably, a flat narrow slit membrane having a width of 0.1-0.8 mm; preferably, a microporous membrane having a pore size of 1-100 microns; or preferably, micro sieve pores having a pore size of 50-600 microns, where a pressure difference is used as driving force to refine a dispersion phase. The dispersion phase channel delivers the dispersion phase, the continuous phase channel delivers the continuous phase, the mixture output channel delivers a reaction mixture, and the mixing chamber connects the dispersion phase channel, the continuous phase channel, and the mixture output channel together and provides a mixing place for the dispersion phase and the continuous phase, where the feature size of each channel is millimeter-scale. Compared with micrometer-scale channels of a micro-channel reactor, the hybrid channels significantly reduce material flow resistance and greatly increase single-channel treatment capacity.

As shown in FIGS. 3-6, in one solution, the micro-reactor includes a base 61, a cover 62, and a micro-dispersion structure 63 arranged between the base 61 and the cover 62.

Figure 4:
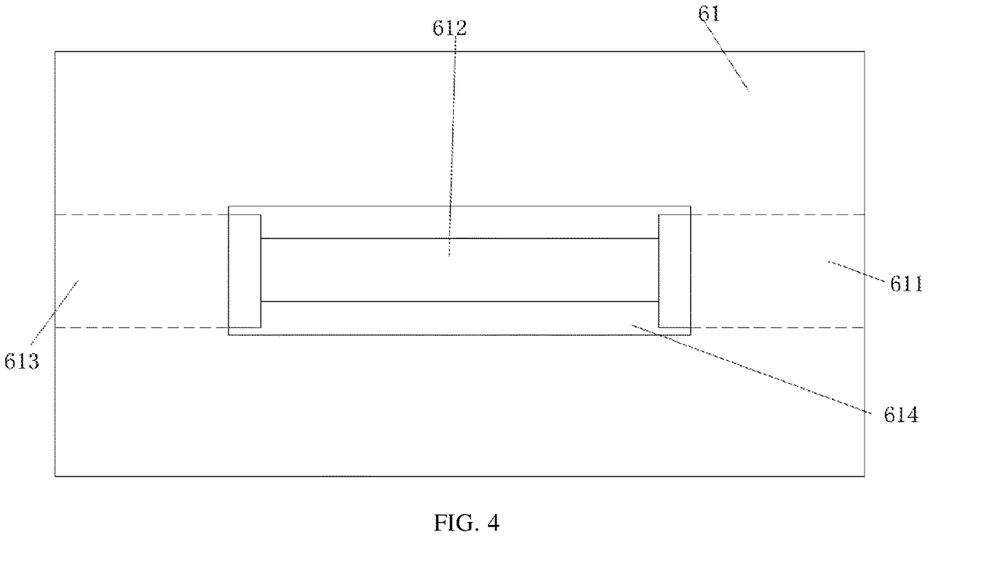
FIG. 4 is a front view of a base of the micro-reactor.

The base is provided with a continuous phase channel 611, a mixing chamber 612, and a mixture output channel 613, where one end of the continuous phase channel 611 is connected to a continuous phase inlet and the other end is connected to the mixing chamber 612, and one end of the mixture output channel 613 is connected to the mixing chamber 612 and the other end is connected to a mixed material outlet. A cross-sectional area of the mixing chamber 612 is greater than that of the continuous phase channel 611/mixture output channel 613. Preferably, the cross-sectional area of the mixing chamber 612 is 0.1-0.9 times, and more preferably 0.1-0.5 times, that of the continuous phase channel 611. The cross-sectional area of the mixing chamber is smaller than that of the continuous phase channel, which is conducive to increasing the flow rate of a mixture in the mixing chamber, decreasing the scale of dispersed droplets, increasing the interface area of two-phase mixing, and reducing the flow pressure of the system.

Figure 5:
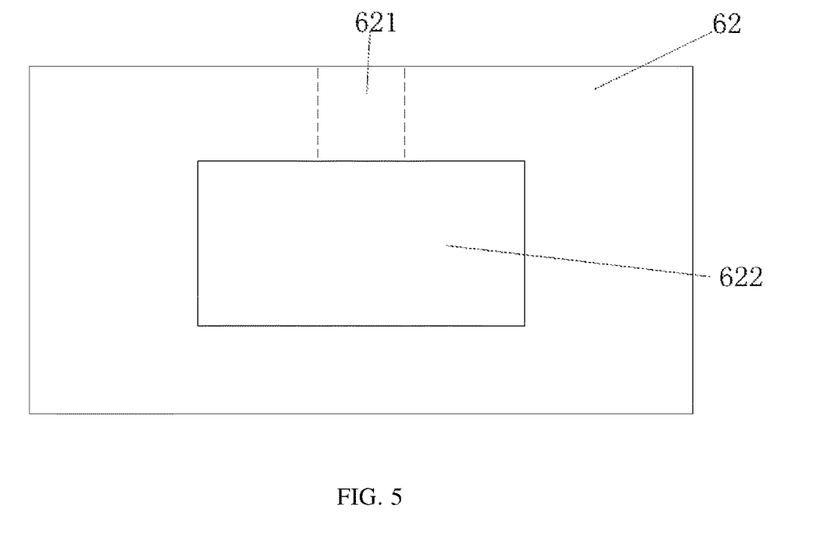
FIG. 5 is a front view of a cover of the micro-reactor.

The cover 62 is provided with a dispersion phase channel 621 and a dispersion chamber 622, where one end of the dispersion phase channel 621 is connected to a dispersion phase inlet and the other end is connected to the dispersion chamber 622. Preferably, a cross-sectional area of the dispersion chamber 622 is greater than or equal to, preferably 2-10 times, and more preferably 3-6 times, that of the dispersion phase. The solution can stabilize internal liquid pressure, and the structure can make the impact between the dispersion phase and the dispersion structure 63 more sufficient to achieve a better dispersion effect. In one solution, the dispersion phase inlet and the continuous phase inlet are arranged in mutually perpendicular directions.

Figure 6:
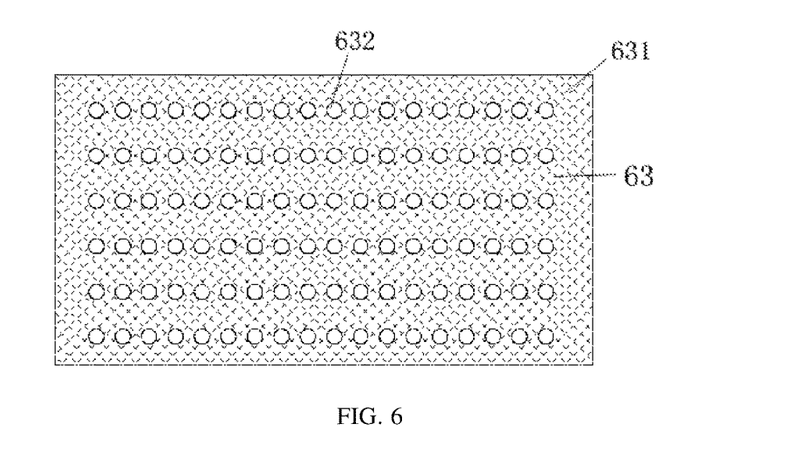
FIG. 6 is a structural diagram of a micro-dispersion medium membrane of the micro-reactor.

The micro-dispersion structure 63 is located between the dispersion chamber 622 and the mixing chamber 612, where the dispersion phase structure 63 may be a micro-dispersion medium membrane, including but not limited to a microporous membrane, micro sieve pores, or a micro narrow slit membrane. FIG. 6 shows a solution of a microporous membrane, where the microporous membrane 63 includes a substrate 631 and a plurality of micropores 632 arranged on the substrate 631. In the figure, circular micropores 632 of the same size are distributed relatively uniformly. However, it should be noted that the micropores 632 may be of different sizes and shapes, such as square, triangle, polygon, irregular, or a combination thereof.

Figure 7:
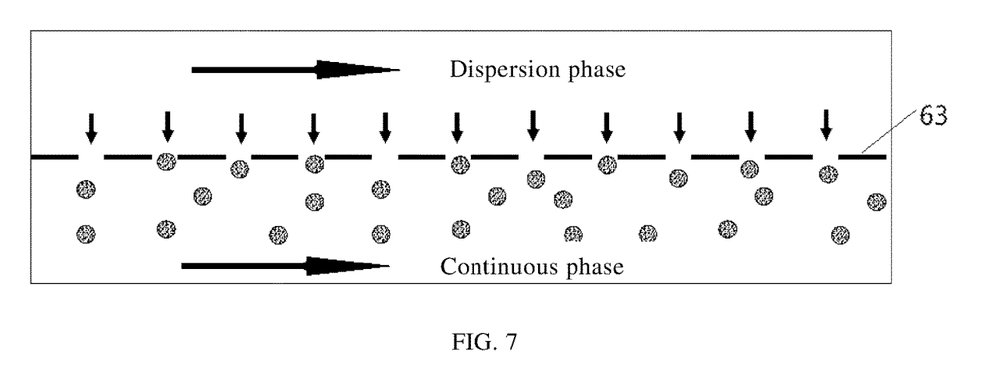
FIG. 7 is a schematic diagram of a mixing process of a reaction solution.

The dispersion phase enters the dispersion chamber 622 through the dispersion phase channel 621 and passes through the micro-dispersion medium membrane 63 under pressure to form dispersed micro-droplets, the micro-droplets enter the mixing chamber 612 and mix with the continuous phase entering from the continuous phase channel 611 to form a mixture, and the mixture enters a next process from the mixture output channel 613. This process can be seen in FIG. 7.

In a preferred solution, the base 61 is further provided with a mounting portion 614 for placing the micro-dispersion structure 63, and the mounting portion 614 may be a groove formed in the base 61 and around the mixing chamber 612.

In one solution, the dispersion phase is dispersed into micro-droplets having a scale of 1-500 microns, and preferably 10-100 microns. If the droplets formed by the dispersion phase are too small, it is difficult to separate two phases, and the difficulty of separation in subsequent processes is increased. If the droplets formed by the dispersion phase are large, the specific surface area of mass transfer between the two phases decreases sharply, which is not conducive to the mass transfer between the two phases and the rapid progress of the reaction.

In one solution, the pore size of the micropores 632 of the microporous membrane is 0.1-80 microns; preferably, the pore size is 0.1-1 micrometer, with a porosity of 5-35%; preferably, the pore size is 1-10 microns, with a porosity of 10-30%; and more preferably, the pore size is 1-10 microns, with a porosity of 20-30%. In one solution, the pore size of the micro sieve pores is 40-300 microns, and preferably 100-200 microns; and the number of micro sieve pores in a single channel is 1-50, and preferably 1-10. In one solution, a gap between the micro narrow slits is 0.1-3 millimeters, and preferably 1-2 millimeters. Although the flow rate of the dispersion phase depends on the process, experiments have found that when the porosity of the dispersion medium is too small, such as when the porosity of the microporous membrane is less than 5%, the flow rate decreases sharply or the pressure increases sharply when the dispersion phase passes through the membrane, which easily causes membrane damage and failure; and when the porosity is too large, such as greater than 30 or more, the formation of droplets will be affected, and even the flow pattern of two phases is changed to affect the mass transfer area of the two phases.

In one solution, a plurality of dispersion phase channels 621, a plurality of continuous phase channels 611, a plurality of dispersion chambers 622, a plurality of mixing chambers 612, a plurality of mixture output channels 613, and one or more dispersion medium membranes 63 are arranged in the micro-reactor 6 to form a plurality of reaction channels.

In one solution, two or more sets of solutions as shown in FIG. 1 are connected in series for operation, that is, the product of the first set is used as an oil phase raw material of the second set for operation. The solution of connecting two or more sets in series can further improve the yield of a product. The series operation of multiple sets refers to use of the reaction product of the previous set of reaction device as a continuous phase raw material for the next set of reaction device to continue the reaction, so as to achieve a higher reaction yield.

In one solution, as shown in FIG. 1, materials from outlets of the micro-reactor and the tubular reactor enter the separation apparatus 3, and are continuously stirred for 1-30 min in the apparatus 3 to achieve a higher product yield.

In one solution, the heat exchangers 9/10 are arranged on the continuous phase channel and the dispersion phase channel of the micro-reactor 6 respectively to cool or heat the continuous phase and the dispersion phase to temperatures required by the process before entering the micro-reactor 6.

In one solution, the process is similar to FIG. 2, except that the reflux material is either the reaction product that is not separated or a small amount of by-product crude glycerol phase.

In the process diagram shown in FIG. 2, the reflux material is a mixture of crude biodiesel, namely, fatty acid-short chain alcohol esters, and methanol. Mixing of the crude biodiesel with the raw oil phase increases the content of the product fatty acid-short chain alcohol esters in the raw oil phase, and decreases the content of fatty acid glycerides. Taking ester exchange between methanol and fatty acid glycerides as an example, the methanol and the fatty acid glycerides are insoluble, and the solubility of the methanol in the fatty acid glycerides is very low. On the other hand, the solubility of the methanol in fatty acid methyl ester is much greater than that in the fatty acid glycerides. The reflux fatty acid methyl ester increases the solubility of the methanol, and the increase in the solubility of the methanol in the oil phase is conducive to a further increase in the rate of ester exchange. The same reason applies to the reaction product in the reflux portion of the system that has not been separated. The principle of reflux of the crude biodiesel is similar to adding other co-solvents to increase the solubility of short chain alcohols in the system and increase the reaction rate, but inconvenience caused by the co-solvents in subsequent treatment and increase in raw material costs are avoided. The reflux crude biodiesel accounts for 0-40%, preferably 10-20%, of a sum of the raw oil and the crude biodiesel.

The acid value of the raw oil phase is ≤6, and more preferably ≤3; and the content of fatty acid glycerides in the raw oil phase is 2-100%. Preferably, when the glyceride content of the original raw oil phase is 2-80%, that is, when the system contains some fatty acid esters or crude biodiesel, the operation mode of the solution as shown in FIG. 1 is used; and more preferably, when the glyceride content of the initial raw oil phase is 2-60%, the operation mode of the solution as shown in FIG. 1 is used. Preferably, when the glyceride content of the original raw oil is 50-100%, the operation mode of the solution as shown in FIG. 2 is used; further preferably, when the glyceride content of the original raw oil is 60-100%, the operation mode of the solution as shown in FIG. 2 is used; and more preferably, when the glyceride content of the initial raw oil is 80-100%, the operation mode of the solution as shown in FIG. 2 is used.

Such a solution is more conducive to saving costs and ensuring the purity of biodiesel.

The separation apparatus 3 mainly functions to separate three types of substances in the system after the reaction: excess short chain alcohols, reaction product biodiesel (fatty acid-short chain alcohol esters), and by-product glycerol. The short chain alcohols are mainly separated by evaporation and condensation, and a device therefor includes but is not limited to a stirred tank with a reduced pressure condenser, a flash tank, a falling film reactor, or the like. The product and the by-product are two liquid phases and are mainly separated by liquid-liquid separation, and a device therefor includes but is not limited to a static separator in a stirred tank, a continuous separator in a tubular reactor, a centrifugal separator, or the like.

The delivery pumps 4 and 5 pump the alcohol phase containing a base catalyst and the raw oil phase to the dispersion phase inlet and the continuous phase inlet of the micro-reactor respectively, the alcohol phase and the raw oil phase are thoroughly mixed and undergo ester exchange reactions in the micro-reactor and the subsequent tubular reactor to generate short chain fatty acid alcohol esters, namely, crude biodiesel and by-product glycerol.

The present application further provides a method for preparing biodiesel by base catalysis, which is completed by the device in the above solution. The method includes the following steps:
  (1) A base catalyst and short chain alcohols are mixed and dissolved in a ratio of 1-6% by mass to form an alcohol phase catalyst.
  (2) The delivery pump 5 delivers a raw oil phase through the heat exchanger 10 to the continuous phase inlet of the micro-reactor 6, a dispersed alcohol phase is delivered by the delivery pump 4 through the heat exchanger 9 to the dispersion phase inlet of the micro-reactor 6 and dispersed into micro-droplets by the micro-dispersion medium membrane of the micro-reactor, and then the micro-droplets and the raw oil are mixed and react.
  (3) The reaction mixture enters a separation tank 13 after reaction in the micro-reactor and the tubular reactor, and short chain fatty alcohols and liquid-liquid phases are evaporated to separate short chain fatty alcohols, crude biodiesel (fatty acid-short chain fatty alcohol esters), and crude glycerol.

The short chain fatty alcohols include but are not limited to methanol, ethanol, etc.

The base catalyst includes but is not limited to potassium hydroxide, sodium hydroxide, potassium methoxide, sodium methoxide, potassium ethoxide, sodium ethoxide, etc.

The content (by weight) of the base catalyst in the short chain fatty alcohols is 1-10%, and preferably 2-6%;

The mass fraction of nitric acid is 65-98%; the mass fraction of sulfuric acid is 97-99%;

The raw oil phase contains 2-100% of fatty acid glycerides, with an acid value of ≤6, and preferably ≤3; the fatty acid glycerides in the raw oil phase include C10-20 long-chain fatty acid glycerides; the oil phase includes but is not limited to soybean oil, palm oil, rapeseed oil, jatropha seed oil, kitchen waste oil, pre-treated gutter oil, industrial mixed oil, etc.

A feeding molar ratio of the short chain fatty alcohols to the fatty acid glycerides in the oil phase is (3-25): 1, and preferably (3-12): 1;

An addition amount of the base catalyst is 0.1-3% by mass of the oil phase, preferably 0.3-1%, and more preferably 0.3-0.5%;

A feed temperature of the alcohol phase is 20-70° C., preferably 50-60° C., and more preferably 54-60° C.; and a feed temperature of the oil phase is 30-90° C., preferably 60-90° C., and more preferably 70-80° C.

The present application will be further described in detail below in conjunction with examples. It should be understood that these examples are used only to illustrate the present application and do not limit the scope of the present application. In addition, it should be understood that after reading the content of the present application, those skilled in the art can make various changes or modifications to the present application and make further promotion to other ester exchange and esterification reaction processes for preparing biodiesel by base catalysis, and these equivalent forms also fall within the scope of the claims attached to the present application.

Example 1

A glyceride content of a raw oil phase was 16%; a single-channel laboratory micro-dispersion reactor was used, and the oil phase was a continuous phase of 100 ml/min; a methanol and potassium hydroxide solution of 20 ml/min was used as a dispersion phase, KOH was used as a catalyst and its content was 4‰ of the mass of the oil phase, and a dispersion medium was 1 micron sintered membrane. The continuous phase and the dispersion phase were heated by a coil, with an inlet temperature of 70° C. for the continuous phase and an inlet temperature of 50° C. for the methanol phase; the continuous phase and the dispersion phase were delivered to continuous phase and dispersion phase inlets of the micro-reactor by delivery pumps, where an outlet of the micro-reactor was connected to a stirrer; a residence time in the micro-reactor was 5.3 seconds; and a water bath temperature in the micro-reactor was 70° C. Materials at the outlet of the micro-reactor were centrifuged, where the oil phase (crude biodiesel) was subjected to gas chromatography analysis, and a total content of residual glycerides (a sum of monoglyceride, diglyceride, and triglyceride) was 1.4%, which met technical standards of industrial products (<2%).

Examples 2-5

Acid catalyzed gutter oil was used as a raw oil phase, with a glyceride content of about 60%; a single-channel laboratory micro-dispersion reactor was used, and the oil phase was a continuous phase of 120 ml/min, with an acid value of 1.81; a methanol and potassium hydroxide solution of 27 ml/min was used as a dispersion phase, KOH was used as a catalyst and its content was 4‰ of the mass of the oil phase, and dispersion media were: micro-slits, micro-pores, a 1 micron sintered membrane, and a 10 micron sintered membrane. The continuous phase and the dispersion phase were heated by a coil, with an inlet temperature of 70° C. for the continuous phase and an inlet temperature of 55° C. for the methanol phase; the continuous phase and the dispersion phase were delivered to continuous phase and dispersion phase inlets of the micro-reactor by delivery pumps, where an outlet of the micro-reactor was connected to a stirrer; a residence time in the micro-reactor was 4.3 seconds; and a reaction temperature was 70° C. Sampled materials were centrifuged and the oil phase (crude biodiesel) was subjected to gas chromatography analysis.

|  | Example 2 | Example 3 | Example 4 | Example 5 |
|---|---|---|---|---|
| Dispersion medium | Micro-slits | Micro-pores | 1 μm sintered membrane | 10 μm sintered membrane |
| Acid value out of the micro-reactor | 0.11 | 0.12 | 0.12 | 0.10 |
| Total content of glycerides at the outlet of the micro-reactor (%) | 2.7 | 2.4 | 5.4 | 5.7 |
| Total content of glycerides after stirring for 10 min (%) | 1.9 | 1.8 | 2.6 | 1.8 |

Example 6

Acid catalyzed gutter oil was used as a raw oil phase, with a glyceride content of about 60%; a single-channel laboratory micro-dispersion reactor was used, and the oil phase was a continuous phase of 150 ml/min, with an acid value of 1.81; a methanol and potassium hydroxide solution of 33.7 ml/min was used as a dispersion phase, KOH was used as a catalyst and its consumption was 4‰ of the mass of the oil phase, and a dispersion medium was: micro-slits. The continuous phase and the dispersion phase were heated by a coil, with an inlet temperature of 70° C. for the continuous phase and an inlet temperature of 60° C. for the methanol phase; the continuous phase and the dispersion phase were delivered to continuous phase and dispersion phase inlets of the micro-reactor by delivery pumps, and resided in the micro-reactor for 6.8 seconds; and a reaction temperature was 70° C. Materials at the outlet of the micro-reactor were centrifuged, and a total content of residual glycerides in the oil phase (crude biodiesel) was 1.9%.

Example 7

Industrial palm oil was used as a raw oil phase, with a glyceride content of about 99%; a single-channel laboratory micro-dispersion reactor was used, and the oil phase was a continuous phase of 60 ml/min; a methanol and potassium hydroxide solution of 13.8 ml/min was used as a dispersion phase (the consumption of methanol was 20% of the mass of the oil phase), KOH was used as a catalyst and its content was 4‰ of the mass of the oil phase, and a dispersion medium was: a 0.5 μm microporous membrane. The continuous phase and the dispersion phase were heated by a coil, with an inlet temperature of 80° C. for the continuous phase and an inlet temperature of 55° C. for the methanol phase; the continuous phase and the dispersion phase were delivered to continuous phase and dispersion phase inlets of the micro-reactor by delivery pumps, and resided in the micro-reactor for 8.5 seconds; and a water bath reaction temperature in the micro-reactor was 80° C. Materials at the outlet of the micro-reactor were centrifuged, where the oil phase was detected by gas chromatography, and a total content of residual glycerides was 20%. The separated oil phase was used as a raw material for secondary micro-reactor operation, with a continuous phase flow rate of 50 mL/min, a methanol and potassium hydroxide solution of 5.5 ml/min was used as a dispersion phase (the consumption of methanol was 10% of the mass of the oil phase), KOH was used as a catalyst and its content was 1‰ of the mass of the oil phase, and a residence time in the micro-reactor was 11.4 seconds; and an inlet temperature of the continuous phase was 80° C., an inlet temperature of the methanol phase was 55° C., and a water bath temperature in the microreactor was 80° C. Materials at the outlet of the micro-reactor were centrifuged, where the oil phase (crude biodiesel) was detected by gas chromatography, and a total content of residual glycerides was 1.7%.

Example 8

Industrial palm oil was used as a raw oil phase, with a glyceride content of about 99%; a single-channel laboratory micro-reactor was used, with a continuous phase of 120 ml/min; a methanol and potassium hydroxide solution of 40 ml/min was used as a dispersion phase (the consumption of methanol was 30% of the mass of the oil phase), KOH was used as a catalyst and its content was 10.0‰ of the mass of the oil phase, and a dispersion medium was: micro-slits. The continuous phase and the dispersion phase were heated by a coil, with a temperature of 80° C. for the oil phase and a temperature of 60° C. for the methanol phase; the continuous phase and the dispersion phase were delivered to continuous phase and dispersion phase inlets of the micro-reactor by delivery pumps, and resided in the micro-reactor for 16 seconds; and a water bath temperature in the micro-reactor was 80° C. Materials at the outlet of the micro-reactor were centrifuged, where the oil phase (crude biodiesel) was detected by gas chromatography, and a total content of residual glycerides was 1.8%.

Examples 9-12

Acid catalyzed gutter oil was used as a raw oil phase, with a glyceride content of about 60%; a pilot scale-up 8-channel micro-reactor was used, and flow rates of the continuous oil phase were 3.0 L/min, 4.0 L/min, 4.5 L/min, and 5.0 L/min, respectively; a methanol and potassium hydroxide solution was used as a dispersion phase, where a mass of an alcohol phase was 20% of that of the oil phase; a mass of potassium hydroxide was 4‰ of that of the oil phase; an oil phase feeding temperature was 70° C., and an alcohol phase feeding temperature was 55° C.; and a reaction occurred in the micro-reactor. Materials at an outlet of the micro-reactor were centrifuged, where the oil phase (crude biodiesel) was detected by gas chromatography. Experimental results were shown in the following table:

|  | Example 9 | Example 10 | Example 11 | Example 12 |
|---|---|---|---|---|
| Flow rate of oil phase L/min | 3.0 | 4.0 | 4.5 | 5.0 |
| Residence time in micro-reactor (s) | 27 | 20 | 18 | 16 |
| Total content of glycerides in the oil phase at the outlet of the micro-reactor (%) | 0.95 | 1.55 | 1.73 | 1.84 |
| Equivalent annual production of biodiesel (tons/year) | 1224 | 1632 | 1836 | 2040 |

It can be seen from the table that the 8-channel pilot micro-dispersion reactor in the present application had an equivalent annual production of 2000 tons of biodiesel. That is, a 4-channel micro-dispersion reactor can achieve a biodiesel production capacity of 1000 tons/year, which can be achieved by thousands of parallel micro-channels of micro-channel micro-reactors in comparative documents (as listed in the background).

Example 13

Industrial mixed oil was used as a raw oil phase, with a glyceride content of about 99%; a pilot scale-up 8-channel micro-reactor was used, and a flow rate of the continuous oil phase was 2.0 L/min; a methanol and potassium hydroxide solution was used as a dispersion phase, where a mass of an alcohol phase was 20% of that of the oil phase; a mass of potassium hydroxide was 10‰ of that of the oil phase; an oil phase feeding temperature was 80° C., and an alcohol phase feeding temperature was 55° C.; and a reaction occurred in the micro-reactor. Materials at an outlet of the micro-reactor entered a separation system. The materials at the outlet of the micro-reactor were sampled and centrifuged, where the oil phase was analyze by gas chromatography, and a total content of residual glycerides was 5.6%. The reaction materials were continuously stirred in a material collection system for 10 min, sampled and centrifuged, where the oil phase (crude biodiesel) was subjected to gas chromatography analysis, and a total content of residual glycerides was 2.0%.

Example 14

Industrial mixed oil was used as a raw oil phase, with a glyceride content of about 99%; a pilot scale-up 8-channel micro-reactor was used, and a flow rate of the continuous oil phase was 2.0 L/min; a methanol and potassium hydroxide solution was used as a dispersion phase, where a mass of an alcohol phase was 15% of that of the oil phase; the mass of potassium hydroxide was 4‰ of that of the oil phase; an oil phase feeding temperature was 80° C., and an alcohol phase feeding temperature was 55° C.; and a reaction occurred in the micro-reactor. Materials at an outlet of the micro-reactor entered a separation system. The reaction materials were separated in the separation system. After phase separation, the oil phase was subjected to gas chromatography analysis, and a total content of residual glycerides was 19.3%.

The separated oil phase of the reaction mixture was fed into the pilot 8-channel micro-reactor again as a continuous phase for secondary reaction, a flow rate of the continuous oil phase was 2.0 L/min, the alcohol phase was adjusted to 10% of the oil phase, and other conditions were the same. After the secondary reaction, the reaction materials discharged out of the micro-reactor were sampled and centrifuged, the separated oil phase (crude biodiesel) was subjected to gas chromatography analysis, and a total content of residual glycerides in the oil phase was 2.0%.

Example 15

Similar to the primary reaction in Example 14, the separated oil phase (with a total residual glyceride content of 19.3%) of the primary reaction mixture was raw secondary reaction oil fed into the pilot 8-channel micro-reactor as a continuous phase for secondary reaction, a flow rate of the continuous oil phase was 3.6 L/min, the alcohol phase was adjusted to 10% of the oil phase, and other conditions were the same. After the secondary reaction, the reaction materials discharged out of the micro-reactor were sampled and centrifuged, the separated oil phase (crude biodiesel) was subjected to gas chromatography analysis, and a total content of residual glycerides in the oil phase was 1.3%.

Example 16

Pre-prepared crude biodiesel (with a residual glyceride content of 1.5%) was mixed with pre-treated soybean oil as a raw material in a ratio of 1:9 to obtain a raw oil phase with a glyceride content of about 90%; and the raw oil phase was used as a continuous oil phase to prepare biodiesel. A pilot scale-up 8-channel micro-reactor was used, a flow rate of the continuous oil phase was adjusted to 3.6 L/min, and a mass of an alcohol phase was 20% of that of the oil phase; a mass of potassium hydroxide was 10‰ of that of the oil phase; an oil phase feeding temperature was 80° C., and an alcohol phase feeding temperature was 55° C.; and a reaction occurred in the micro-reactor. Materials at an outlet of the micro-reactor entered a separation system. The materials at the outlet of the micro-reactor were sampled and centrifuged, where the oil phase (crude biodiesel) was subjected to gas chromatography analysis, and a total content of residual glycerides was 1.7%.

Example 17

Similar to Example 16, crude biodiesel (with a residual glyceride content of 1.5%) delivered by a crude biodiesel reflux pump was mixed with soybean oil as a raw material delivered by a continuous phase pump in a ratio of 2:8, and the mixture entered a continuous phase inlet of a pilot micro-reactor after heat exchange by a heat exchanger. A pilot scale-up 8-channel micro-reactor was used, a total flow rate of the continuous oil phase was 3.6 L/min (where a flow rate in the reflux pump was 0.6 L/min and a flow rate of the soybean oil was 3.0 L/min), and a mass of an alcohol phase was 20% of that of the oil phase; a mass of potassium hydroxide was 10‰ of that of the oil phase; an oil phase feeding temperature was 80° C., and an alcohol phase feeding temperature was 55° C.; and a reaction occurred in the micro-reactor. Materials at an outlet of the micro-reactor entered a separation system. The materials at the outlet of the micro-reactor were sampled and centrifuged, where the oil phase (crude biodiesel) was subjected to gas chromatography analysis. After 5 minutes, 10 minutes, 20 minutes, and 30 minutes of the reaction, the materials were sampled at the outlet of the micro-reactor, and total contents of residual glycerides in the crude biodiesel were 1.7%, 1.75%, 1.8%, and 1.8%, respectively.

Comparative Example 1 (Compared to Examples 9-12)

Acid catalyzed gutter oil was used as a raw oil phase (with a glyceride content of about 60%), the consumption of methanol was 20% of the mass of the oil phase, the consumption of potassium hydroxide was 4‰ of the mass of the oil phase, and a base catalyzed ester exchange reaction occurred in an industrial stirred tank with a volume of 30 cubic meters. The reaction temperature was 60-70° C., and the reaction time (excluding feed time and discharge time) was 2 hours. After the reaction, samples were collected and centrifuged, where the oil phase was subjected to gas chromatography analysis; and a total content of residual glycerides in the oil phase was 1.9%.

By comparing Comparative Example 1 to Examples 9-12, under the requirement that the total content of residual glycerides in the oil phase after the reaction was <2%, the reaction time (residence time in the micro-reactor) was 16-27 seconds in Examples 9-12 where a micro-dispersion micro-reactor was used, while the reaction time in the stirred tank was 2 hours in Comparative Example 1.

Comparative Example 2 (Compared to Example 8)

| Type | Micro-reactor structure | KOH‰ | Treatment capacity mL/min | Document |
|---|---|---|---|---|
| Micro-dispersion | Micro-slit dispersion | 1.0 | 160 | Example 8 |
| Micro-tube | φ0.75 mm*1.5 m | 1.0 | 1.56 | Qu Gang, Master's Thesis 2015 from Zhejiang University |
| Micro-tube | φ0.8 mm*5 m | 1.16 | 1.67 | Mohadesi et al. Renewable Energy 136 (2019) 677-682 |
| Z micro-channel | 1.5*1.5 mm$^2$*2 m | 1.2 | 25 | CN201310036534 |
| Micro thin layer channel | 23*10*0.2 mm$^3$ | 1.0 | 0.0046 | US20090165366A1 |

Compared to the patent CN201310036534, when a maximum total flow rate of a two-phase feed in a single channel was about 25 ml/min, the single-channel treatment capacity in Example 8 was about 6 times larger. Compared to other comparative documents, the single-channel flow rate in Example 8 was 2-4 orders of magnitude higher than that in other documents.

Described above are merely the preferred embodiments of the present application. It should be pointed out that, for those of ordinary skill in the art, a plurality of improvements and modifications may also be made without departing from the principles of the present application, and these improvements and modifications may also be regarded to be within the scope of protection of the present application. In addition, although some specific terms are used in the specification, these terms are only for convenience and do not constitute any limitation on the present application.

What is claimed is:

1. A device for preparing biodiesel by base catalysis, wherein the device comprises a feeding system, a micro-reaction apparatus, a separation apparatus, and a reflux apparatus;
   the feeding system is in communication with the micro-reaction apparatus, and the micro-reaction apparatus is in communication with the separation apparatus;
   the micro-reaction apparatus comprises a micro-reactor, and the micro-reactor is a micro-dispersion micro-reactor;
   in the micro-reaction apparatus, an oil phase and short chain alcohols undergo ester exchange reaction under base catalysis to generate fatty acid esters and by-product glycerol; and
   the micro-dispersion micro-reactor is provided with a micro-dispersion structure for dispersing the short chain alcohols into micro-droplets, the short chain alcohols are methanol or ethanol;
   the reflux apparatus is connected between the outlet of the separation apparatus and the outlet of a raw oil tank of the feeding system for mixing part of the reaction products after separation by the separation apparatus with the initial raw oil.

2. The device for preparing biodiesel by base catalysis according to claim 1, wherein the micro-reaction apparatus further comprises a stirred tank or a tubular reactor, wherein the micro-reactor is connected to the stirred tank or tubular reactor and then connected to the separation apparatus; and the separation apparatus comprises a stirred tank with a reduced pressure condenser and a centrifuge.

3. The device for preparing biodiesel by base catalysis according to claim 1, wherein the micro-dispersion structure is a dispersion medium membrane; the dispersion medium membrane comprises a microporous membrane, micro sieve pores, or a micro narrow slit membrane; and a pore size of the microporous membrane, a pore size of the micro sieve pores, and a feature size of the micro narrow slit membrane are all micrometer-scale.

4. The device for preparing biodiesel by base catalysis according to claim 1, wherein the micro-reactor comprises a base, a cover, and a micro-dispersion structure arranged between the base and the cover, the base being provided with a continuous phase channel, a mixing chamber, and a mixture output channel, one end of the continuous phase channel is connected to a continuous phase inlet and the other end is connected to the mixing chamber, one end of the mixture output channel is connected to the mixing chamber and the other end is connected to a mixed material outlet; the cover is provided with a dispersion phase channel and a dispersion chamber, one end of the dispersion phase channel is connected to a dispersion phase inlet and the other end is connected to the dispersion chamber; the micro-dispersion structure is located between the dispersion chamber and the mixing chamber, a dispersion phase enters the dispersion chamber through the dispersion phase channel and passes through a micro-dispersion medium membrane under pressure to form dispersed micro-droplets, the micro-droplets enter the mixing chamber and mix with a continuous phase entering from the continuous phase channel to form a mixture, and the mixture enters a next process from the mixture output channel.

5. A method for preparing biodiesel by base catalysis using the micro-reaction device according to claim 1, wherein the method comprises:
(1) dissolving a base catalyst in short chain alcohols to form short chain alcohol-base catalyst solution as an alcohol phase;
(2) delivering the alcohol phase and an oil phase to dispersion phase and continuous phase feed ports of the micro-reactor by the feeding system respectively, followed by a mixing reaction in the micro-reactor to obtain a reaction solution; and
(3) delivering the reaction solution to the separation apparatus after complete reaction in a tubular reactor or stirred tank.

6. The method for preparing biodiesel by base catalysis according to claim 5, wherein reaction materials are mixed and react in the micro-reactor in two forms: a continuous phase and a dispersion phase, the oil phase serves as the continuous phase, the alcohol phase serves as the dispersion phase, and the dispersion phase enters the continuous phase by means of a dispersion medium in a form of micro-droplets.

7. The method for preparing biodiesel by base catalysis according to claim 5, wherein the oil phase contains 2-100% of fatty acid glycerides, with an acid value of ≤6.

8. The method for preparing biodiesel by base catalysis according to claim 5, wherein the dispersion phase is controlled at a temperature of 20-75° C. by a heat exchanger before feeding; and the continuous phase is controlled at a temperature of 20-90° C. by a heat exchanger before feeding.

9. The method for preparing biodiesel by base catalysis according to claim 5, wherein a molar ratio of the short chain alcohols in the alcohol phase to the fatty acid glycerides in the oil phase is (3-25):1.

10. The method for preparing biodiesel by base catalysis according to claim 5, wherein the content of the base catalyst in the alcohol phase is 1-10%.

11. The method for preparing biodiesel by base catalysis according to claim 6, wherein the oil phase has an acid value of ≤3.

12. The method for preparing biodiesel by base catalysis according to claim 9, wherein the dispersion phase is controlled at a temperature of 50-60° C. by a heat exchanger before feeding; and the continuous phase is controlled at a temperature of 40-90° C. by a heat exchanger before feeding.

13. The method for preparing biodiesel by base catalysis according to claim 10, wherein the dispersion phase is controlled at a temperature of 54-60° C. by a heat exchanger before feeding; and the continuous phase is controlled at a temperature of 70-80° C. by a heat exchanger before feeding.

14. The method for preparing biodiesel by base catalysis according to claim 12, wherein a molar ratio of the short chain alcohols in the alcohol phase to the fatty acid glycerides in the oil phase is (3-12):1.

15. The method for preparing biodiesel by base catalysis according to claim 14, wherein the content of the base catalyst in the alcohol phase is 2-6%.

\* \* \* \* \*